(12) United States Patent
Liao

(10) Patent No.: US 6,199,674 B1
(45) Date of Patent: Mar. 13, 2001

(54) STRUCTURE OF A WIRE WINDING BOX

(76) Inventor: Sheng Hsin Liao, No. 137, San Chun St., Shu Lin Jen, Taipei Hsien (TW)

( * ) Notice: Subject to any disclaimer, the term of this patent is extended or adjusted under 35 U.S.C. 154(b) by 0 days.

(21) Appl. No.: 09/332,099

(22) Filed: Jun. 14, 1999

(30) Foreign Application Priority Data

May 17, 1999 (TW) .................................................. 88207863

(51) Int. Cl.7 ..................................................... H02G 11/00

(52) U.S. Cl. ............................................................ 191/12.4

(58) Field of Search ............................ 191/12 R, 12.2 R, 191/12.4, 12.2 A

(56) References Cited

U.S. PATENT DOCUMENTS

| | | | | |
|---|---|---|---|---|
| 3,715,526 | * | 2/1973 | Blanch et al. | 191/12.2 R |
| 3,854,017 | * | 12/1974 | Crim | 191/12.2 R |
| 4,713,497 | * | 12/1987 | Smith | 191/12.2 R |
| 5,180,040 | * | 1/1993 | Ji | 191/12.2 R |
| 5,718,310 | * | 2/1998 | Gallo | 191/12.2 R |
| 5,819,893 | * | 10/1998 | Wagner et al. | 191/12.4 |

* cited by examiner

Primary Examiner—Mark T. Le
(74) Attorney, Agent, or Firm—Rosenberg, Klein & Lee

(57) ABSTRACT

An improved structure of a wire winding box comprises a housing, a first communication cable, a second communication cable, a spiral spring, a first conductive disk, and a second conductive disk. The first conductive disk is installed with an inner and outer rings. A spiral spring is received within the outer ring, and the second communication cable winds the outer portion of the outer ring. A linear groove and a matched positioning block are installed within the inner ring. Two sides of the linear groove are alternatively extended with a plurality of cambered groove with unequal diameters so that one end thereof may receive each conductive piece at the respective position in the two sides of the positioning block so as to retain an electric contact with the conductive ring on the second conductive disk. By the aforementioned structure, the width and volume can be reduced effectively and a beautiful outlook is retained so that the present invention can be widely used in a mobile phone, a wireless phone, a phone without holding receiver, and other communication devices for increasing the convenience thereof.

7 Claims, 10 Drawing Sheets

STRUCTURE OF A WIRE WINDING BOX

BACKGROUND OF THE INVENTION

The present invention relates to a wire winding box, and especially to a wire winding box with rewound freely communication cables. Thus, it may be used in various communication device and avoid the improper winding of the cables. Moreover, by the special design, each component can be arranged effectively in space.

Various kinds of wire winding boxes are developed for avoiding the improper winding of cables in communication devices. The structure of the wire winding box includes a housing, two conductive disks, at least one spiral spring, and two communication cables. One of the conductive disks is installed with a plurality of concentric conductive rings with unequal diameters and connected to each conductive wire of a communication cable. Another conductive disk is installed with a plurality of conductive pieces or metal rolling balls which are connected to the conductive wires of another communication cable. One rotary conductive disk is installed with a spiral spring and is wound around by communication cable. Therefore, as two conductive disks are rotated respectively, an electric connection is retained. Thus, the communication cable can be pulled out or rewound. Such kinds of structures have been produced and sold in commercial market, and may be referred to U.S. Pat. No. 5,082,484, Taiwan Patent Nos. 88203835, 8721430, 86221455, etc.

However, the prior art wire winding boxes have some defects, such as winding of communication cables, receiving of the spiral spring, the space arrangement of the conductive piece or metal rolling ball or other important components with respect to the conductive disk which dose not be arranged properly. Thus, in order that these components can be well spaced for avoiding interference, some space must be sacrificed and the wire winding box must be extended laterally. Thus, the wire winding box will be wider or have a large volume. Therefore, it is inconvenient and not beautiful. Moreover, if it is used in the portable device, a big trouble will be induced since it is not easy to be carried.

SUMMARY OF THE INVENTION

Accordingly, the object of the present invention is to provide an improved structure of a wire winding box, wherein the communication cable, spiral spring, and conductive piece or metal rolling ball, etc and other electrically connecting components are arranged on the inner and outer sides of a conductive disk. Thus, the space arrangement is more compact and the width and volume of the wire winding box is greatly reduced so as to have a beautiful outlook.

Another object of the present invention is to provide an improved structure of a wire winding box, the distal end of the communication cable is installed with a microphone and an earphone. Another cable is installed with a plug for being inserted into a mobile phone, a wireless telephone, a phone without holding a receiver, and other communication mainframe. Thus, it may be used in a long distance communication and increase the convenience of communication device.

A further object of the present invention is to provide an improved structure of a wire winding box, by the special buckling structure thereof, as a communication cable is pulled out with a predetermined distance, it will be buckled and the length is fixed temporarily for being used. While another length is pulled out, the buckling effect will be released automatically. Therefore, the user will not be interrupted by the elastic force due to rewind the cable and the required length can be pull out conveniently.

The present invention will be better understood and its numerous objects and advantages will become apparent to those skilled in the art by referencing to the following drawings in which:

DETAILED DESCRIPTION OF THE PREFERRED EMBODIMENT

Figure 1:
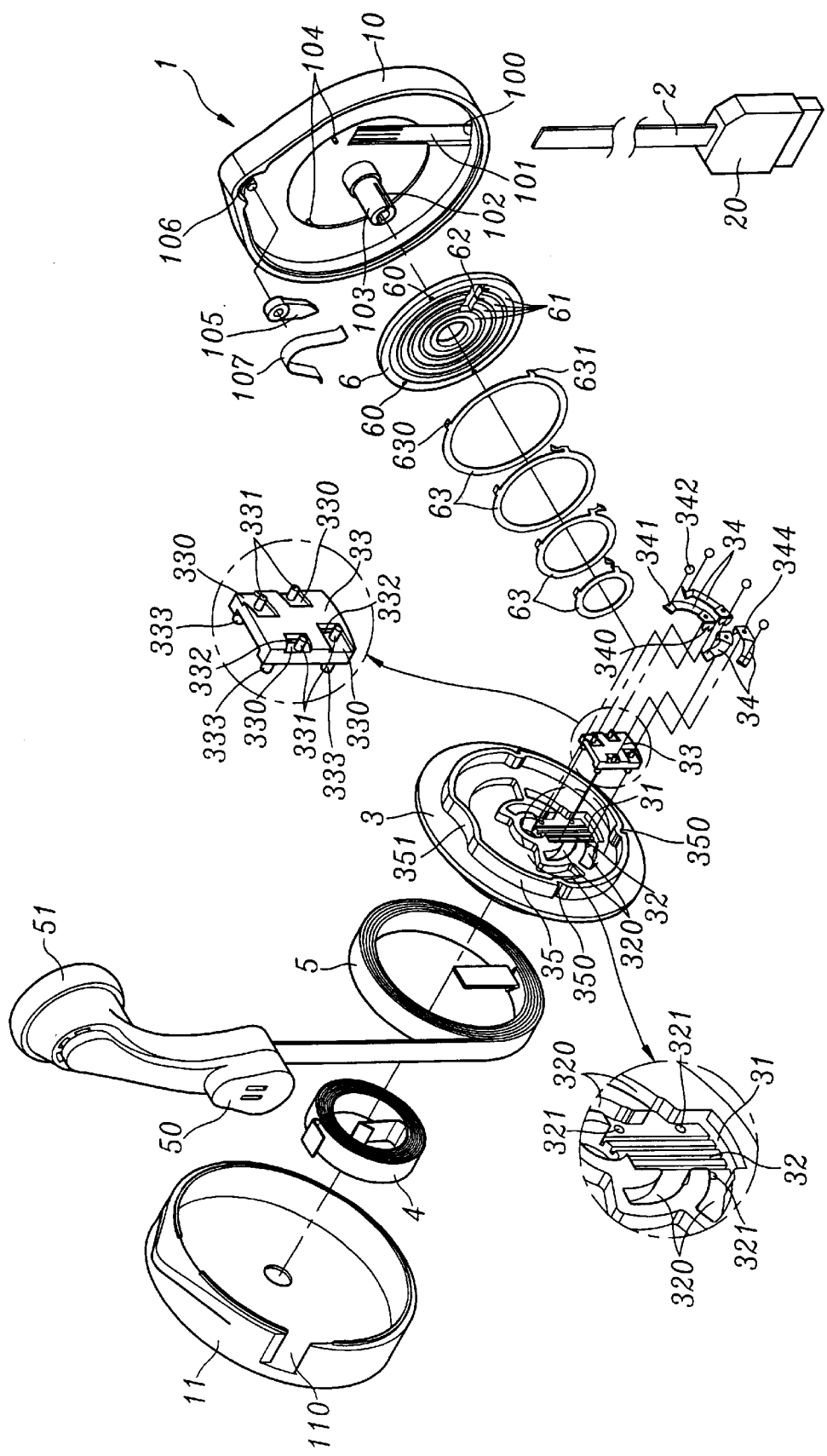
FIG. 1 is an exploded perspective view of the present invention.

With reference to FIG. 1, the improved structure of a wire winding box includes a housing 1, a first communication cable 2, a first conductive disk 3, a spiral spring 4, a second communication cable 5 and a second conductive disk 6.

The housing 1 is formed by a first housing 10 and a second housing 11. In the proper positions of the first housing 10 are installed with a linear hole 100 and a line slot 101 for being inserted by the first communication cable 2 to be fixed therein. A plug 20 with proper shape is installed at the outer end of the first communication cable. A pivotal shaft 103 with slot 102 is formed at the center of the lateral surface of the housing, while the periphery thereof is installed with a plurality of posts 104. The second housing 11 is still installed with a linear hole 110 for being penetrating through by the second communication cable 5 installed with a microphone 50 and an earphone 51.

Figure 3:
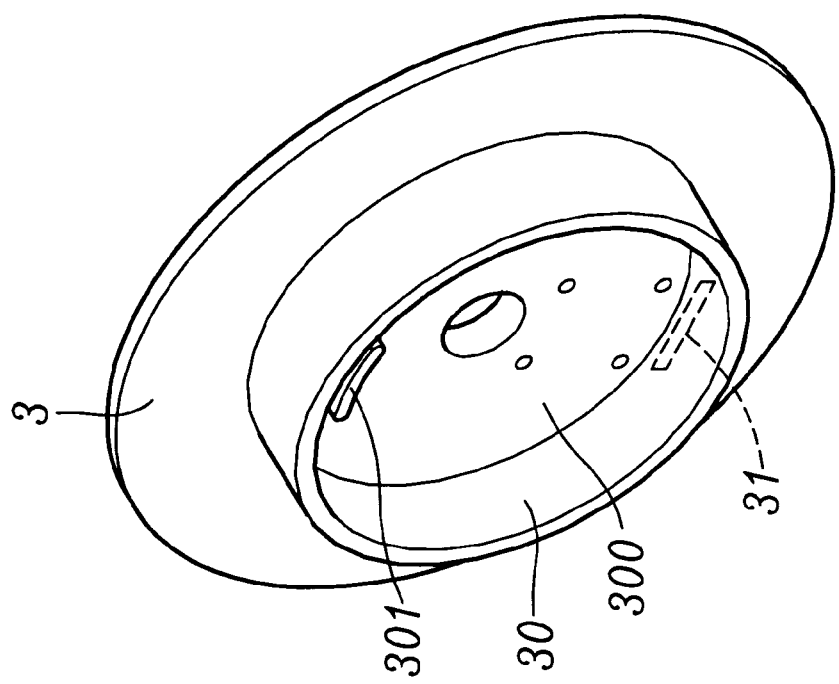
FIG. 3 is a perspective view of another side of a first conductive disk according to the present invention.

The first conductive disk 3 is penetrated through the pivotal axis 103 and may rotate freely. The outer lateral surface thereof adjacent to the second housing 11 is installed with an outer ring 30 with a receiving groove 300 (as shown in FIG. 3) for receiving a spiral spring 4. One end of the spiral spring 4 is embedded into the groove 102 of the pivotal shaft 103. While another end thereof is hooked to the hook 301 of the outer ring 3. The second communication cable 5 is wound around the outer ring 30. The inner lateral surface of the conductive disk is further installed with a linear hole 31 and a linear groove 32 for being inserted by the second communication cable 5 and being position therein. The linear groove 32 is installed with a plurality of cambered groove 320. Moreover, a further positioning block 33 matching with the linear groove 32 is further installed. While two sides thereof are formed with a plurality of alternative cambered grooves 320 with unequal diameters. A positioning block 33 matched with the linear groove 32 is further installed. The bottom of the positioning block 33 is installed with a plurality of posts 333 which may be inserted into the concave hole 321. Two sides thereof are installed with alternative positive grooves 330. Each groove 330 is formed with a positioning post 331 and a through hole 332 for being fixed with a cambered conductive piece 34.

Figure 4:
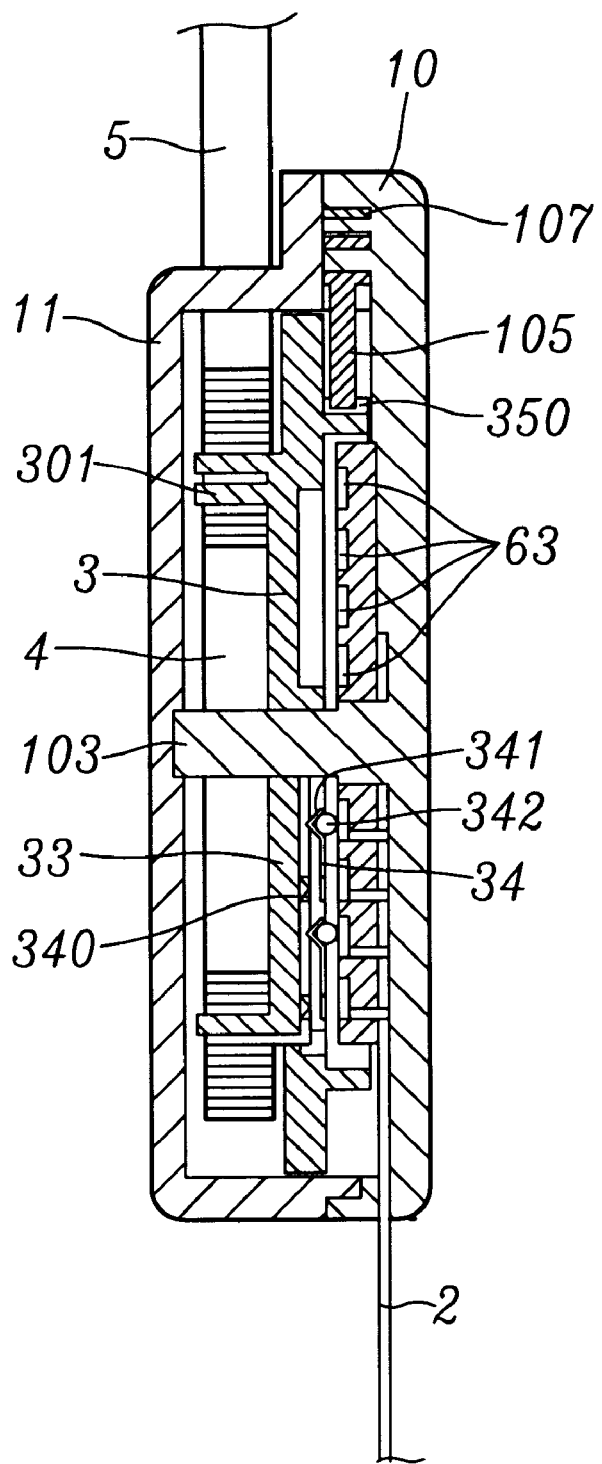
FIG. 4 is a schematic cross sectional view of the assembled structure of the present invention.

The inner side of each conductive piece 34 is installed with a fork end 340 and have a positioning hole 34, which can be inserted into the through hole 332 so as to be inserted into the respective conductive line of the second communication cable 5 and then is covered on the positioning pillar 331, finally is fixed to the positioning groove 330 by rivets. While each conductive piece 34 is exactly received in the respective cambered groove 320. The outer end of the conductive piece 34 is bent so as to present with a concave portion 341 for receiving a metal rolling ball 342, or a convex portion 343 projected outwards as another embodiment shown in FIG. 2 in order to retain to contact with second conductive disk 6 as shown in FIG. 4.

Figure 2:
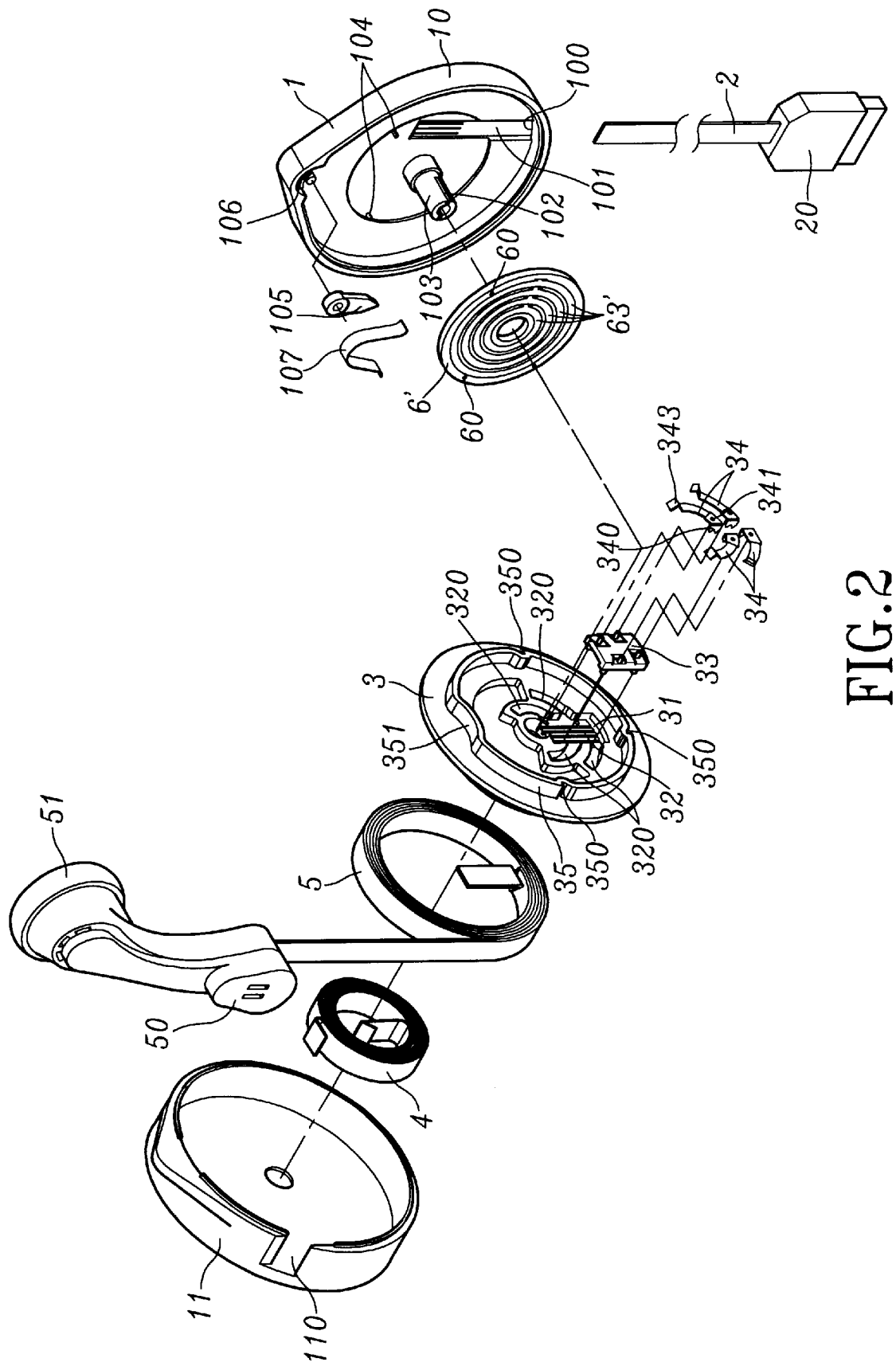
FIG. 2 is the exploded perspective view of another embodiment according to the present invention.

The second conductive disk 6 is installed with a plurality of concave holes 60 so as to be positioned in the convex posts 104 of the first housing 10. A plurality of concentric circular slots 61 with unequal diameters are installed in the inner lateral surface thereof. Each circular slot 61 is installed with positioning hole (not shown). A radial extended through hole 62 is formed at one side of the disk so that the plurality of metal conductive rings 63 with different diameters can be embedded in the respective slot 61 one by one. Thus, the positioning piece 630 is inserted into the positioning hole for being positioned and a inserting piece 631 is inserted into the through hole 62 so as to be inserted into the linear groove 101 of the first housing 10 on the respective conductive wire of the first communication cable 2. Thus, each conductive ring 63 is contacted continuously with the conductive piece 34 of the first conductive disk 3. The second conductive disk 6 may be designed as another embodiment as shown in FIG. 2. Namely, it may be formed as a printed circuit board 6' (PCB). A plurality of concentric conductive circular circuits 63' with unequal diameters is layout thereon by plating. Besides, terminals are pierced into the lateral side of the conductive circular circuits so as to be electrically connected to the first communication cable 2, or conductive wires is welded to the printed circuit board 6'.

Figure 5:
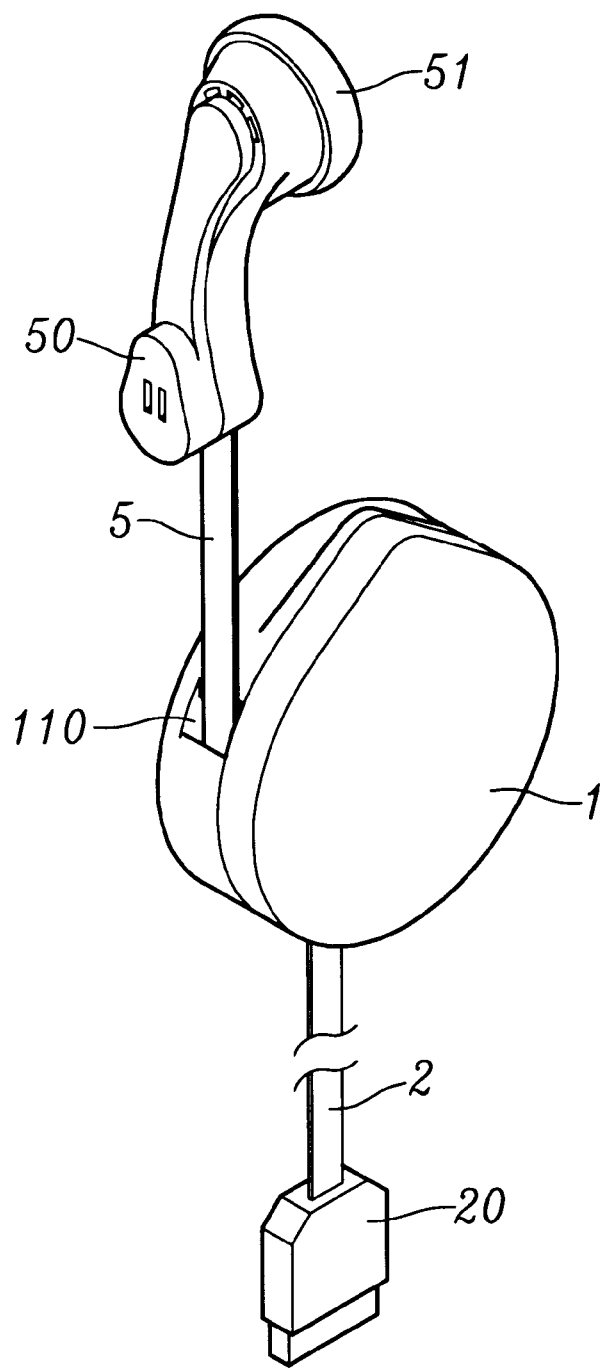
FIG. 5 shows the outlook of the assembled structure of the present invention.
Figure 6:
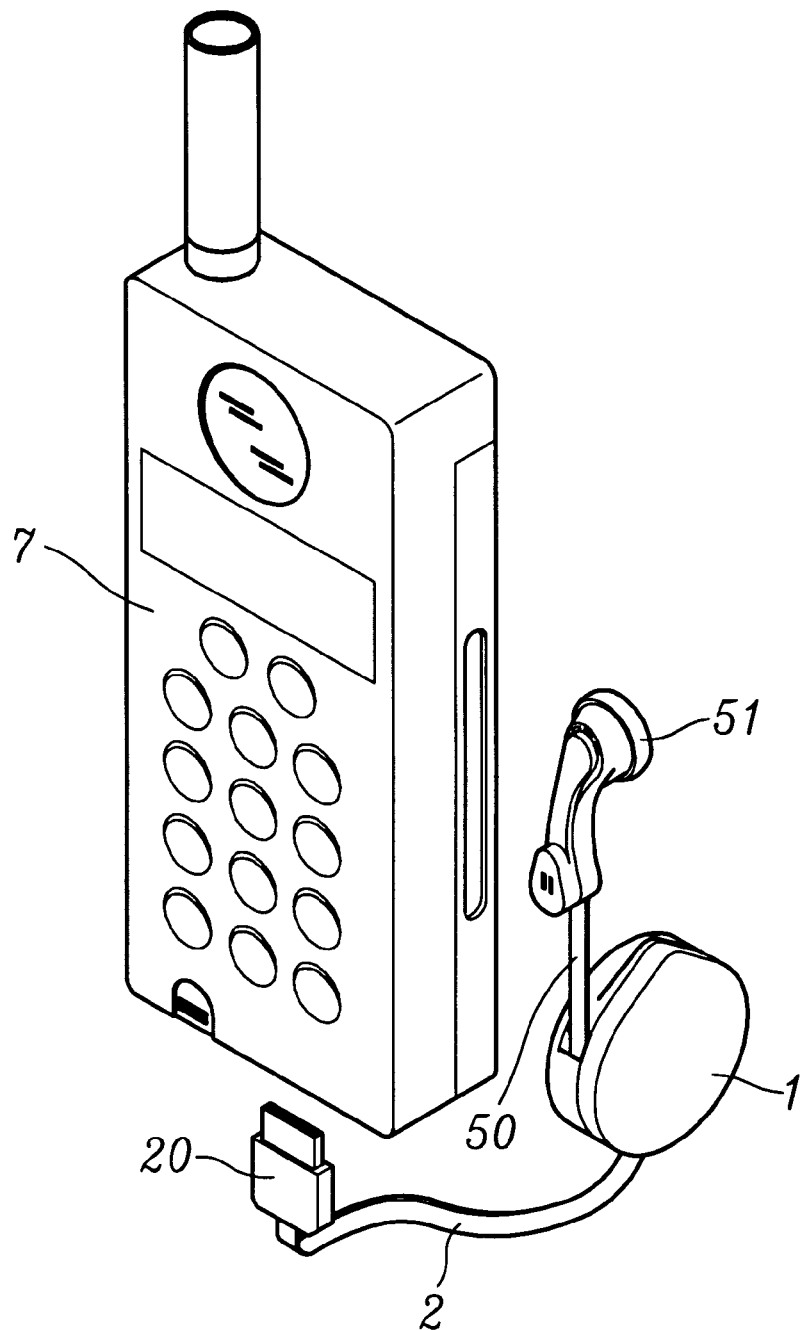
FIG. 6 is a perspective view of an embodiment according to the present invention.
Figure 7:
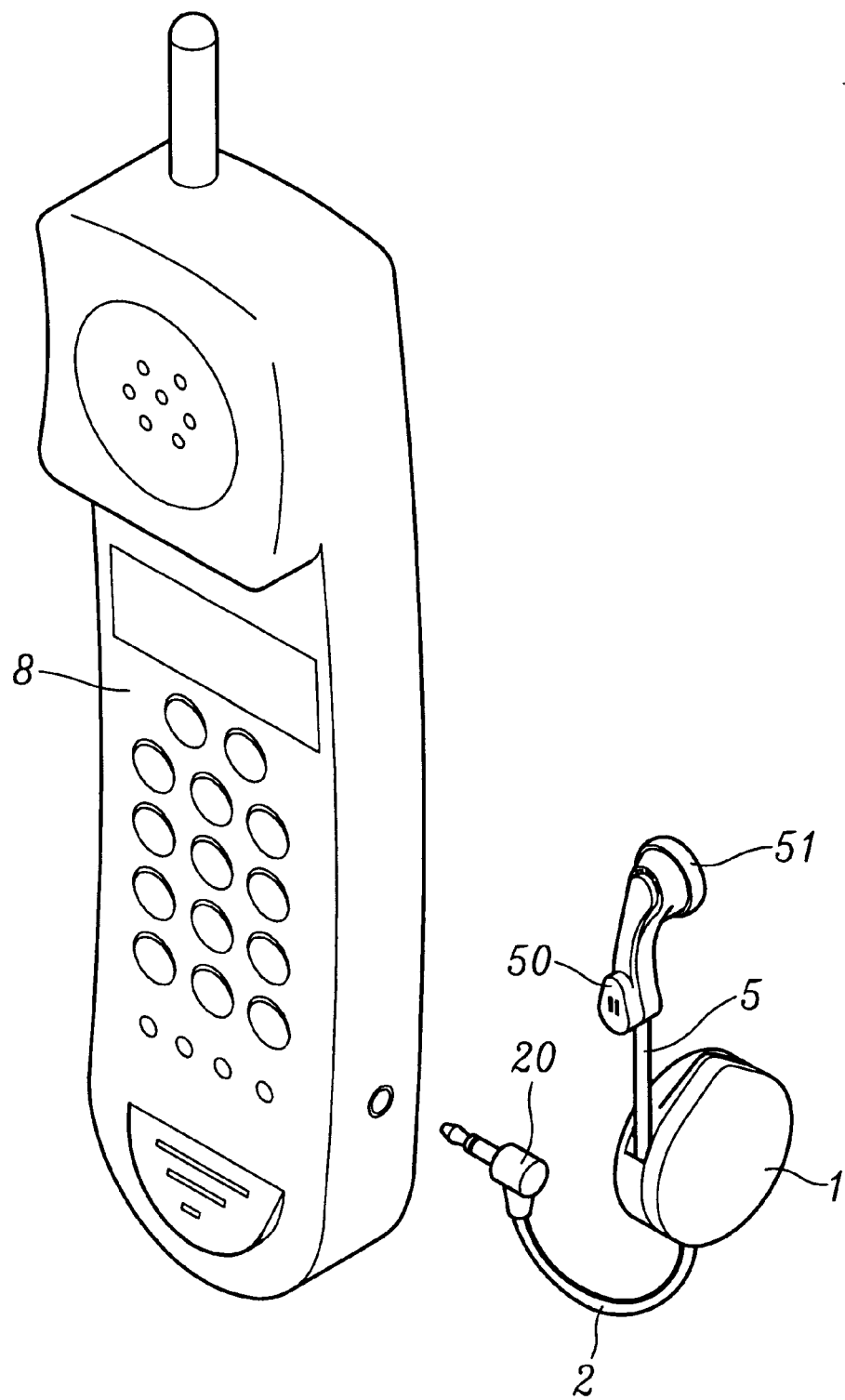
FIG. 7 is a perspective view of another embodiment according to the present invention.
Figure 8:
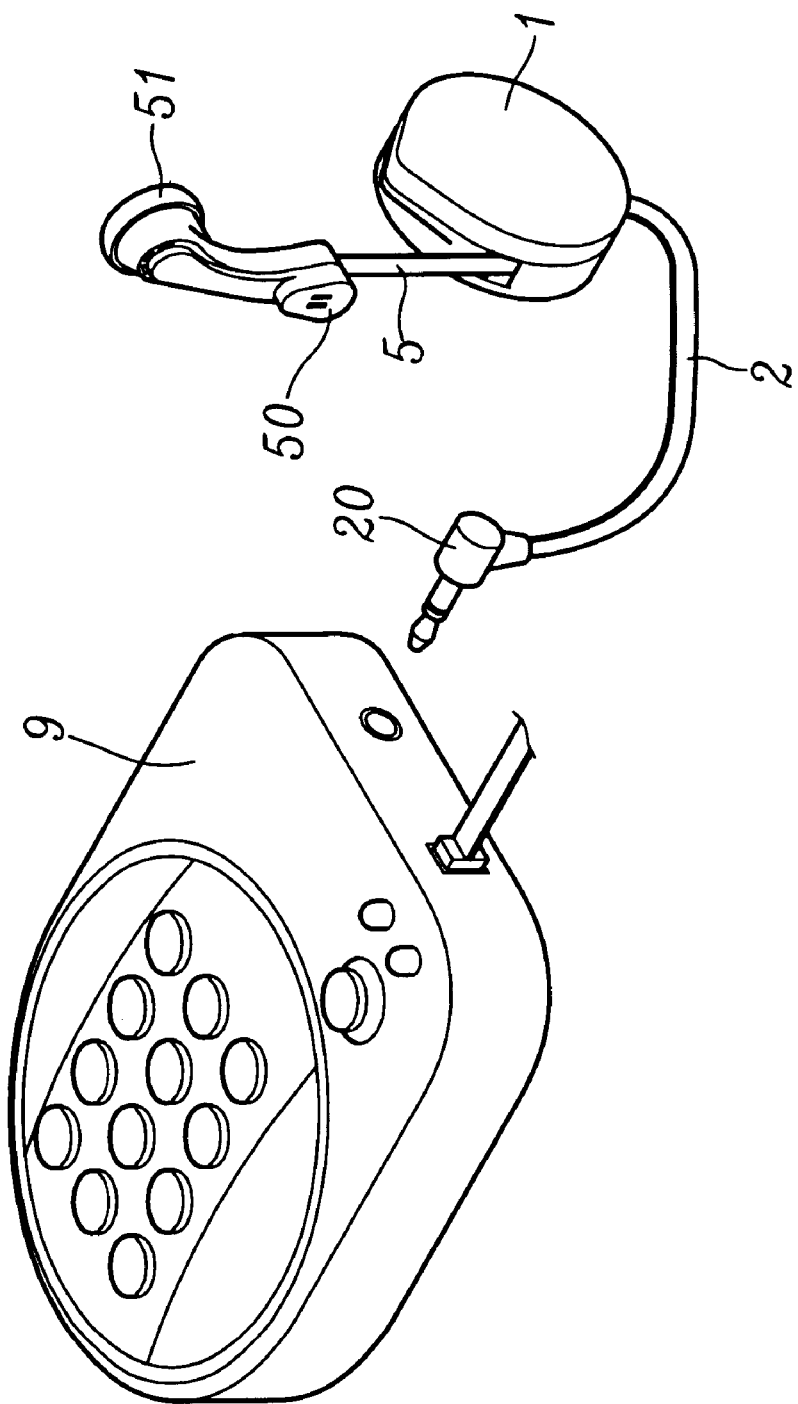
FIG. 8 is a perspective view of a further embodiment according to the present invention.

Thereby, a wire winding box shown in FIG. 5 is formed. In practical application, by the property that the wire winding box can be wound for receiving a proper length of the second communication cable 5, as the application embodiment shown in FIG. 6, a user may insert the plug 20 of the first communication cable 2 into the receptacle of a mobile phone 7, after setting, when a call is received, the user only needs to pull out a second communication cable 5 with an earphone 51 and a microphone 50 to be near the ear or the second communication cable 5 is fixed to be near the ear in advance, thus, the object of talking without holding a receiver is attained. Therefore, it is suitable to be used during driving or other conditions inconvenient to hold a receiver. Moreover, the cable will retain a predetermined rewinding stress. Therefore, not only the distance for extending the cable for talking is long enough and the cable will not be intricate. As the talking is over, the spiral spring 4 within the wire winding box will rewind the first communication cable 5 automatically so as to reduce the space occupied by the cable. Similarly, this principle can be used in another embodiment shown in FIG. 7, namely, by inserting the plug 20 of the first communication cable 2 into a wireless phone 8, or as another embodiment shown in FIG. 8, inserting that into a simple type phone without taking receiver, similarly, the effect of talking without holding receiver and by pulling out the second communication cable 5 as a cable for talking without holding receiver is achieved. Moreover, in a very long talking radius, the user can still talk freely and the two hands can perform other work. If it is not used, the cable will rewind automatically.

Figure 10:
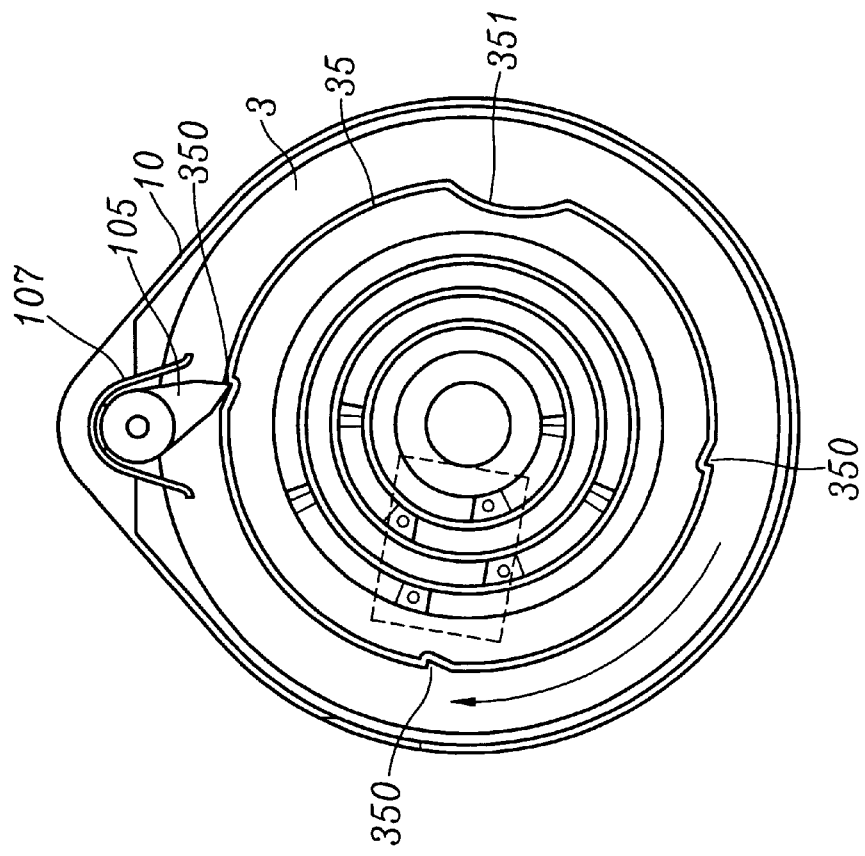
FIG. 10 is a plane view schematically showing that the first conductive disk in the present invention is buckled.
Figure 9:
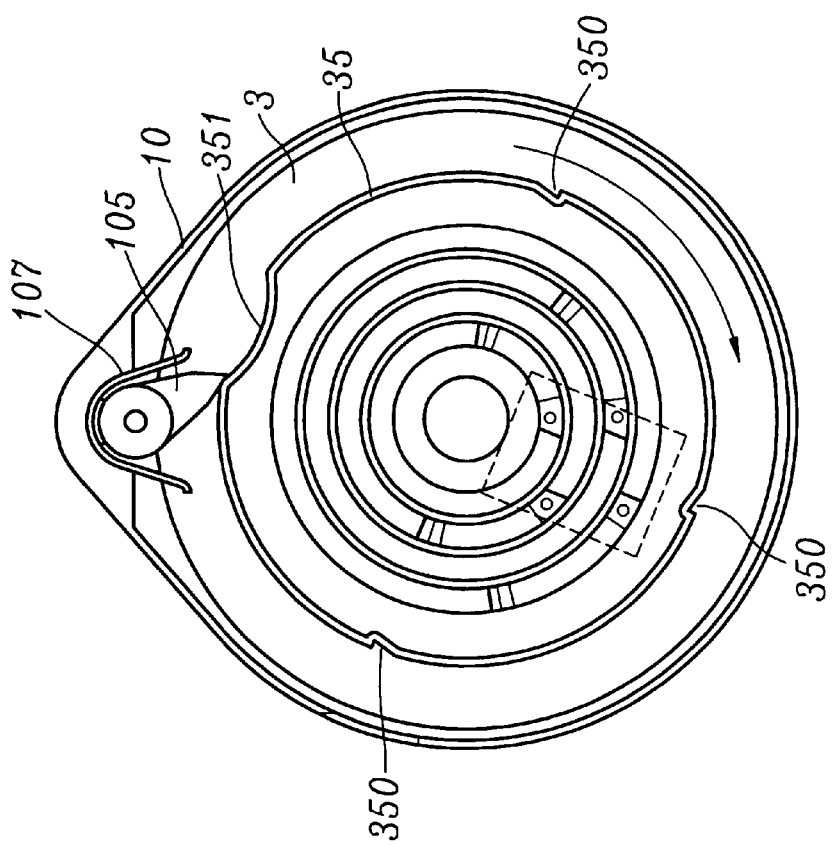
FIG. 9 is a plane view schematically showing that the first communication cable is pulled out so that the first conductive disk rotates continuously.
Figure 11:
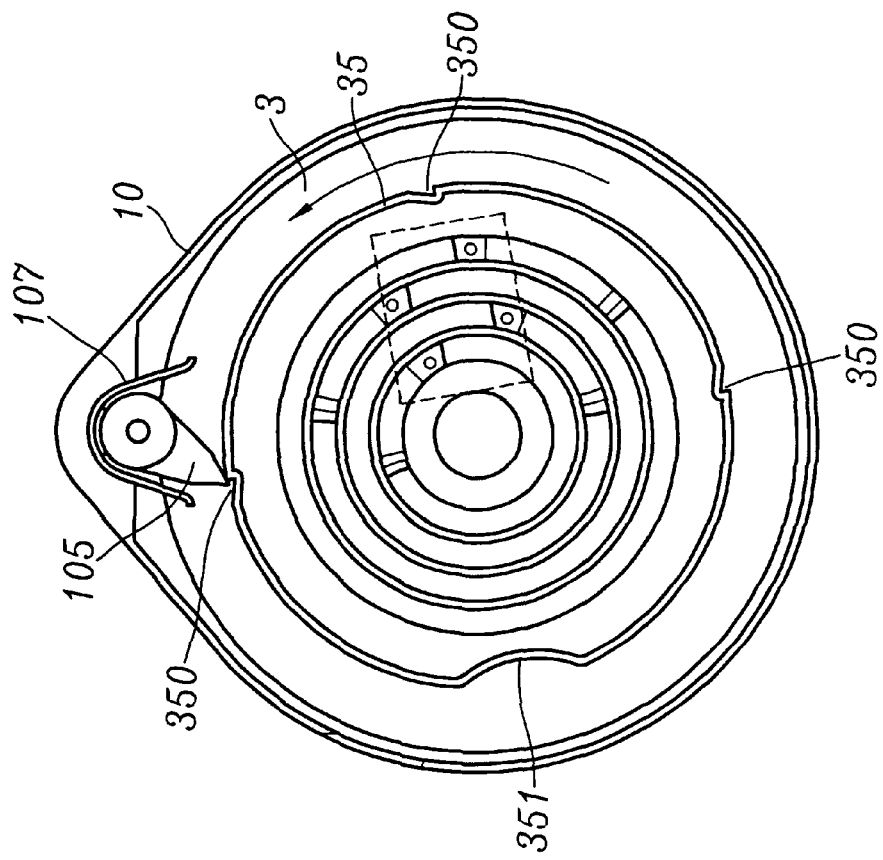
FIG. 11 is a plane view schematically showing the first communication cable is wound so that the second conductive disk is rewound.
Figure 12:
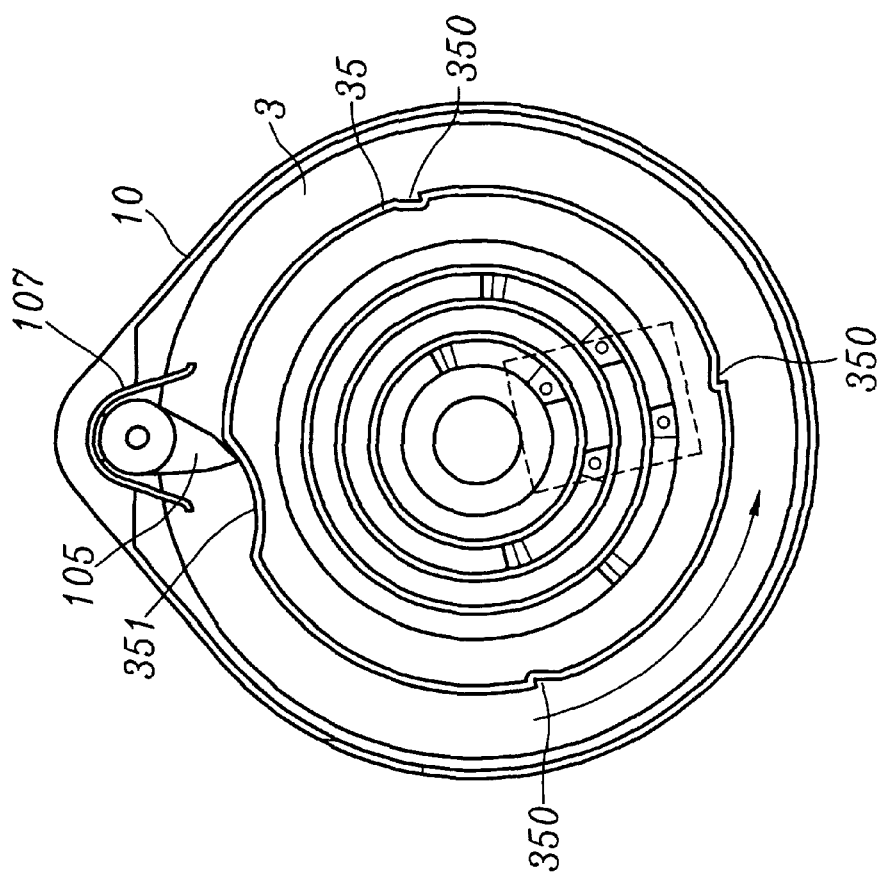
FIG. 12 is a plane view schematic showing that the first communication cable is rewound continuously.

In order that as the user pulls out the second communication cable 5 for using without being affected by the stress of the winding cable, a vibrate-able buckling block 105 is installed on one side within the first housing 10. The rear side of the buckling block 105 is installed with a cambered groove 106 for being arranged with a V shape elastic piece 107 so as to enclose the two sides of the buckling block 105, an inner ring 35 is formed at the inner lateral surface of the first conductive disk 3 at least one inclined buckling groove 350 and a cambered notch 351 are spaced and installed at proper positions of the inner ring 35. Therefore, when the second communication cable 5 is pulled out so that the first conductive disk 3 rotates counterclockwise, as shown in FIG. 9, the buckling block 105 will be driven to shift leftwards due to friction force at the edge of the disk of the buckling block and then is to resist against the right side of the V shape elastic piece 107. It if rotates and moves forwards, it will not buckle the buckling groove 350 and the notch 351. But if the buckling block is stopped to be pulled in a proper timing, the spiral spring 4 will rewind, and buckling block 105 will be embedded into one buckling groove 350 so as to stop moving (as shown in FIG. 10). That is, when the user pull the second communication cable 5 with a proper length, he (or she) may fix the length in an extending position without rewinding the cable. However, if the second communication cable 5 is desired to be rewind completely, the cable only needs to be pulled a little so that the cambered notch 351 to move to the tip end of the buckling block 105, as shown in FIG. 11, then the cable is released for rewinding, then the buckling block 105 will drop into the notch 351, and by the elastic force of the V shape elastic piece 107, the buckling block 105 will vibrate leftwards. Then, even if the groove 350 passes through sequentially, as shown in FIG. 12, no buckling action is induced. Therefore, the first conductive disk 3 will rewind the first communication cable 5 freely.

Thereby, by the structure design of the first conductive disk 3, the spiral spring 4, second communication cable 5, and all of the conductive piece 34 can be received within the inner and outer lateral surfaces in a compact way. Thus, a compact wire winding box is obtained by the present invention. As a result, not only the first communication cable 2 and the first communication cable 5 can be installed with respective communication plugs so as to be applied between the mainframe of a general phones and a receiver. Moreover, it can be properly used in a mobile phone 7, wireless phone 8, and phone without holding a receiver 9.

Although the present invention has been described using specified embodiment, the examples are meant to be illustrative and not restrictive. It is clear that many other variations would be possible without departing from the basic approach, demonstrated in the present invention.

What is claimed is:

1. An improved structure of a wire winding box comprising:

a housing formed by a first housing member, and a second housing member;

a first communication cable installed at the first housing member;

a rotatable freely first conductive disk received within the second housing member;

an outer ring with a receiving chamber being installed at an outer surface of the first conductive disk, a linear groove and a match positioning block being installed at an inner surface of the first conductive disk, a plurality of cambered grooves with unequal diameters being formed alternatively at two sides of the linear groove, while a plurality of cambered conductive pieces being interleaved at two sides of the positioning block so that the conductive pieces can be received within the cambered grooves;

a spiral spring being received within the receiving chamber, and one end of the spiral spring being firmly secured to the second housing member, another end of the spiral spring being firmly secured to the first conductive disk;

a second communication cable being wound around the outer ring of the first conductive disk, one end of the second communication cable being inserted into the linear groove of the first conductive disk so that each conductive wire of the second cable is connected to a respective one of the conductive pieces;

a second conductive disk fixed to the first housing member, a plurality of concentric conductive rings with unequal diameters being installed at an inner lateral side of the second conductive disk for being in contact with the conductive pieces of the first conductive disk, and each said conductive ring is connected to a conductive wire of the first communication cable.

2. The improved structure of the wire winding box as claimed in claim 1, wherein an end of each said conductive piece of the first conductive disk contacting with a respective one of the conductive rings of the second conductive disk is installed with a concave portion, and a metal rolling ball is arranged within the concave portion for being in contact with the respective one of the conductive rings of the second conductive disk.

3. The improved structure of the wire winding box as claimed in claim 1, wherein an end of each said conductive piece of the first conductive disk contacting with a respective one of the conductive rings of the second conductive disk is installed with a convex portion for being in contact with the respective one of the conductive rings of the second conductive disk.

4. The improved structure of the wire winding box as claimed in claim 1, wherein an inner ring is formed at the inner surface of the first conductive disk; at least one bucking groove and one notch are spaced and installed at positions of the inner ring; a freely rotary buckling block is pivotally arranged at one side within the first housing member, and is capable of moving on the inner ring so as to be buckled into the buckling groove or slid into the notch; and an elastic piece is arranged at a lateral side of the buckling block.

5. The improved structure of the wire winding box as claimed in claim 1, wherein an end of the first communication cable is installed with a plug, while another end of the second communication cable is installed with a microphone and an earphone.

6. The improved structure of the wire winding box as claimed in claim 1, wherein the second conductive disk is a printed circuit board installed with a plurality of concentric conductive ring circuits.

7. The improved structure of the wire winding box as claimed in claim 1, wherein an end of each said conductive piece of the first conductive disk adjacent to the positioning block is formed with a fork end and has a positioning hole; two sides of the positioning block are alternatively arranged with positioning grooves; the positioning grooves are installed with positioning posts and through holes so that the fork end of each said conductive piece is inserted into the through hole so as to be in connection with the second communication cable; and the positioning hole is covered by the positioning post.

* * * * *